No. 12,821.
REISSUED JUNE 30, 1908.
A. F. PRESTON.
NAILING MACHINE.
APPLICATION FILED MAY 13, 1907.
2 SHEETS—SHEET 1.
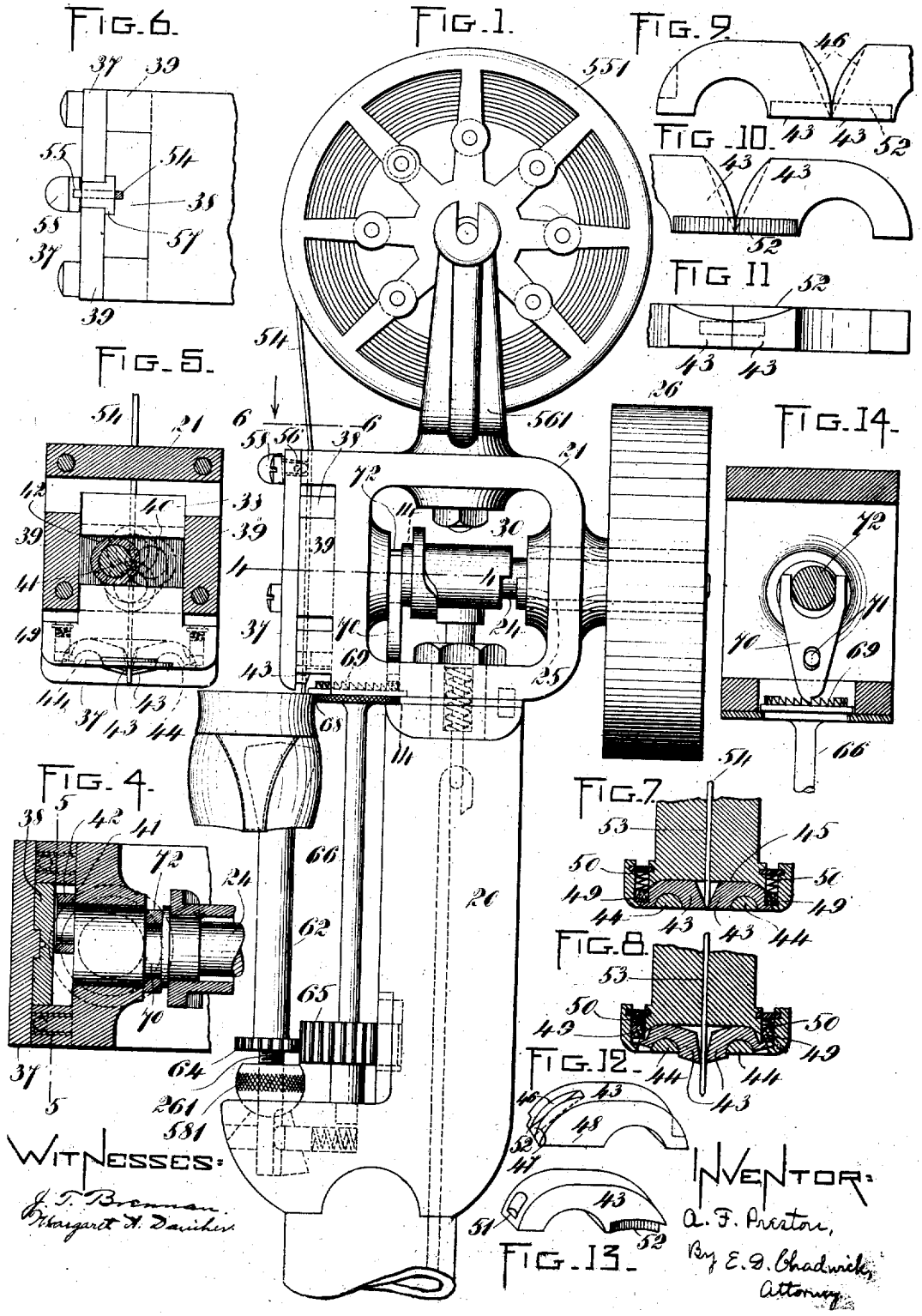
WITNESSES:
J. T. Brennan
Margaret A. Daniher
INVENTOR:
A. F. Preston,
By E. S. Chadwick,
Attorney.

No. 12,821.
A. F. PRESTON.
REISSUED JUNE 30, 1908.
NAILING MACHINE.
APPLICATION FILED MAY 13, 1907.
2 SHEETS—SHEET 2.
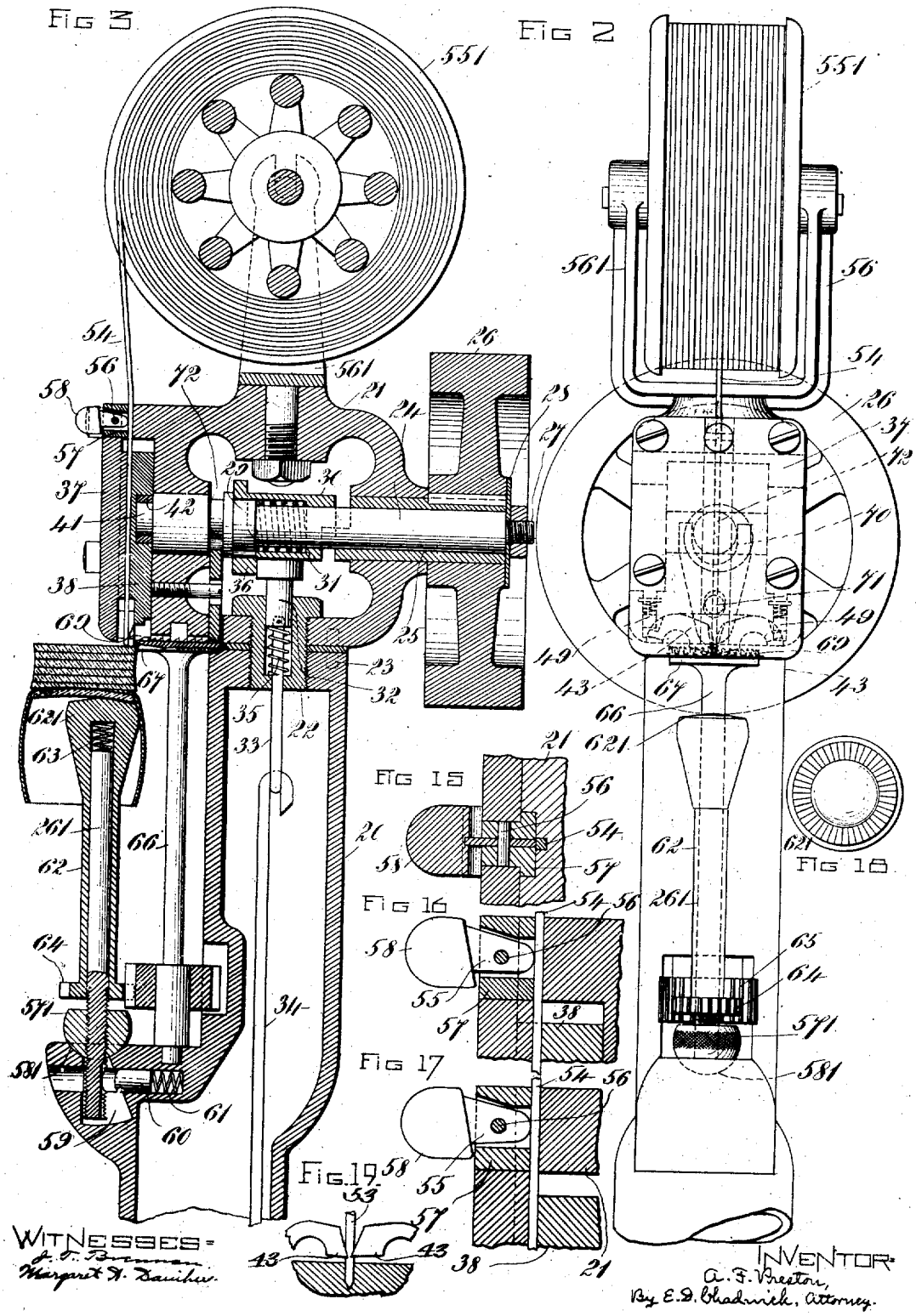

UNITED STATES PATENT OFFICE.

ALBERT F. PRESTON, OF EAST BOSTON, MASSACHUSETTS, ASSIGNOR, BY MESNE ASSIGNMENTS, TO UNITED SHOE MACHINERY COMPANY, OF PATERSON, NEW JERSEY, A CORPORATION OF NEW JERSEY.

NAILING-MACHINE.

No. 12,821. Specification of Reissued Letters Patent. Reissued June 30, 1908.

Original No. 822,867, dated June 5, 1906, Serial No. 32,943. Application for reissue filed May 13, 1907. Serial No. 373,522.

*To all whom it may concern:*

Be it known that I, ALBERT F. PRESTON, of East Boston, in the county of Suffolk and State of Massachusetts, have invented certain new and useful Improvements in Nailing-Machines, of which the following is a specification.

This invention has relation to nailing-machines or machines for driving fasteners of various kinds. It is applicable not only for driving slugs, but for driving nails, screws, &c.

The object of the invention is to provide certain improvements in certain machines of the class referred to whereby they may be simplified in construction and rendered more highly efficient in operation than has heretofore been possible with such machines.

On the accompanying drawings I have illustrated and in the following specification I have described a machine which embodies the invention; but it will be borne in mind that various changes may be made in its construction and mode of operation without departing from the spirit and scope of the invention, that the phraseology which I employ is for purposes of description and not of limitation, and that I reserve the right to employ all known mechanical equivalents for the various parts of the machine where substantially the same results are accomplished by their employment.

Referring to said drawings, Figure 1 represents a side elevation of a slugging-machine. Fig. 2 represents a front elevation of the same. Fig. 3 represents a longitudinal section therethrough. Fig. 4 represents a section on the line 4—4 of Fig. 1. Fig. 5 represents a section on line 5—5 of Fig. 4. Fig. 6 represents a section on line 6—6 of Fig. 1. Figs. 7, 8, 9, 10, 11, 12, and 13 represent in detail the movable carrier or driving-head and the devices mounted thereon. Fig. 14 represents a section on line 14—14 of Fig. 1. Figs. 15, 16, and 17 represent a lock for the wire. Fig. 18 represents in plan view the feeding device which enters the shoe. Fig. 19 is a detail view, partly in section, showing the jaws in engagement with the wire.

Referring to the drawings, the machine thereon illustrated comprises an upright standard 20, which is preferably hollow and is provided with a suitable base. (Not shown.) Upon the top of the standard is placed a frame 21, preferably formed of cast metal. Said frame is open from side to side, as shown in Fig. 1, and it is secured to the standard by a hollow bolt 22, arranged as shown in Fig. 3. A dowel-pin 23 coacts with the bolt in holding the frame against movement. Journaled in the frame is the longitudinally-arranged shaft 24, having a loose bushing or sleeve 25, to which the driving-pulley 26 is keyed. This pulley is relatively heavy, so as to impart its momentum to the driving-head, and is adapted to be driven by a belt in the usual way. The end of the shaft 24 is reduced and threaded to receive a nut 27 and a washer 28, by which the pulley 26 is held against movement axially of the shaft. The shaft is formed with a flange 29 between its ends, and keyed on said flange is a sleeve 30, which is extended between the flange and the bushing 25. The sleeve and the bushing constitute a clutch for locking the pulley 26 to the shaft 24. To operate the clutch, I provide a pin 32, which is connected by a rod 33 with a link 34, extending down through the standard to a suitable foot-lever. The pin 32 is adapted to slide up and down in the aperture formed in the hollow bolt 22; but it is held normally upward by a spring 35.

The sleeve 30 is formed with a cam-flange 36, which is adapted to engage the head of the pin 32 during the rotation of the sleeve 30 and draw the latter out of engagement with the bushing 25. The sleeve 30 is likewise provided with a stop (not shown) to engage the pin 32 and stop the rotation of the shaft at a predetermined point after the sleeve 30 is disengaged from the bushing 25. By depressing the foot-treadle continuously and thereby holding downward the pin 32, the shaft will be rotated continuously; but upon releasing the foot-treadle and permitting the spring 35 to return the pin 32 to the position shown in Fig. 3 the cam-flange 36 is engaged by the head thereof and the sleeve 30 is drawn from the bushing 25, whereupon the shaft immediately stops.

To the end of the frame is secured a plate 37. Between said plate and the frame there is placed a carrier or driving-head 38. Said carrier is adapted to be reciprocated vertically and slides between the guides 39, 39, projecting forwardly from the frame. It is formed with a transverse groove 40, adapted to receive an eccentric-pin 41 on the end of the shaft 24, a roll 42 being mounted upon said pin to reduce friction. Upon examining Fig. 5 it will be seen that the rotation of the shaft 24 through the medium of the eccentric-pin 41 effects a reciprocation of the head or carrier 38. The lower portion of the carrier is laterally extended and projects beneath the guides 39, 39, as shown in Fig. 5. In the lower end of the carrier there is formed a recess the end walls of which are in the form of a quadrant. In said recess are placed two jaws 43, 43, which jaws are pivotally supported upon studs 44. The outer ends of said jaws are fitted to slide in curved grooves formed by the pivots 44 and the end walls of the recess, said end walls being concentric to the pivots 44.

When the jaws are in the position shown in Fig. 7, they are flush with the bottom face of the driving-head, which head forms a supporting stop for the jaws when closed. The pivots 44 are cut away so that their pivotal centers are in line with the bottom face of the head, and the apertures which receive them are formed in the edges of the jaws, said jaws, however, being held in operative position with relation to each other and to the pivots by the curved walls of the recess 45. Each jaw is formed with a groove 46 and with a sharp cutting edge 47, said edge being formed at the junction of the bottom of the groove 46 and the face 48 of the jaw. The said edge is located in a plane which passes directly through the axis of motion of the jaw, and when the jaws occupy the position shown in Fig. 7, with the faces 48 in alinement or lying in the same plane, the cutting edges just meet. They are normally held yieldingly in that position by pins 49, arranged in sockets in the head or carrier, there being in said sockets springs 50. The pins 49 enter notches 51 in the outer ends of the jaws, as best shown in Figs. 8 and 13. The bottom faces of the jaws are cut away at one edge, as shown at 52, (see Fig. 11,) whereby they are adapted to engage the flange of one of the feeding-wheels, as shown in Fig. 5, near the lower extreme of movement of the head, so that said jaws may be forced into cutting position. Through the head there is an aperture 53 to receive the wire from which the nail or slug is formed. Said wire is indicated at 54, and it passes around a reel 551, having trunnions loosely journaled in uprights 561 on the top of the frame 21. The wire is passed downward through the aperture 53 and out between the jaws, (lying in the groove 46 therein), and the cutting edges of said jaws yieldingly engage the wire by reason of the pressure against their outer edges of the spring-pressed pins 49.

When the head or carrier descends, the jaws engage the wire sufficiently to feed it downward and to force it into the work therebeneath. As soon as the jaws, however, engage the work or their cut-away portions 52 engage the feeding-disk or any other suitable stop the further descent of the head or carrier forces the cutting edges toward each other as the jaws swing about the pivots 44, and said cutting edges nip or sever the wire. During this severing of the wire, the driving action of the jaws ceases, since their cutting edges are no longer moving downward, said jaws being so mounted upon the head or carrier that the latter is capable of completing its downward movement after the downward movement of the cutting edges of the jaws has been arrested. As the head rises it is necessary that some device be provided to prevent the retrograde movement of the wire, and hence I provide an automatic locking device, as shown in Figs. 15, 16, and 17. It consists of a finger 55, fulcrumed upon a pin 56, passed through a block 57, arranged in a groove in the plate 37. A weight 58 is on the outer end of the finger and holds the inner end against the wire 54. The finger yields to permit the wire to move downward past it, but on the slightly retrograde movement of the wire firmly grips it against the end of the frame, as shown in Fig. 15, and locks it against further movement.

From this description it will be seen that as the driving-head or carrier reciprocates the jaws operate to force the ends of the wire into the work, feeding it at the same time, and also to sever the said end. By reason of these three functions performed by the jaws I sometimes term them "a combined driving and severing mechanism," or "a combined feeding and severing mechanism," or "a combined feeding and driving mechanism."

The stop and clutch mechanism is so constructed and arranged that when the machine is at rest the driver is at its upper extreme of movement, and during one rotation of the shaft the carrier or driving-head is moved downward to its lower extreme of movement and then upward to its original position.

Any suitable mechanism may be utilized to support the work, and likewise any suitable mechanism may be employed for feeding it beneath the reciprocatory head. For many reasons I prefer to employ those which are illustrated on the drawings and which I shall now proceed to describe.

Referring to Fig. 3, reference-numeral 261 indicates a post which is threaded at its lower end to receive a substantially spherical nut 571, which rests in a socket 581, forming the upper part of a laterally-extending projection on the standard 20. The lower end of the post projects downward into an aperture 59, which permits the upper portion of said post to be swung outwardly. A pin 60, which is held outward by a spring 61, has a web projecting into a groove in the post and holds said post yieldingly upright and firmly against rotation. The provision of the spherical nut permits an adjustment of the post and also permits it to swing outwardly. Placed loosely upon the post is a sleeve 62, having at its end a head 621 which is milled or toothed, as shown in Fig. 18. Between the end of the post and the head there is placed a cushioning-spring 63. I denominate the post and the sleeve the "work-support," and I likewise include the head and the sleeve in the "work-feeding mechanism." On the lower end of the sleeve is a pinion 64, which is substantially equal in diameter to the head. With the pinion intermeshes a spur-wheel 65 on an upright shaft 66, journaled in the standard and in the frame. On its upper end the shaft carries a feed disk 67 which is milled on its outer edge and is adapted to engage the outer edge of the top lift of the heel when a shoe is placed upon the support. Immediately above the feeding disk or wheel there is a flange 68, which is adapted to project over or overlap the top lift into the path of the jaws, as previously described, and on the top face of the feeding-wheel there are formed radial ratchet-teeth 69. (See Fig. 14). A ratchet 70 is pivoted upon a stud 71, with its end in operative relation to the ratchet-wheel, and is capable of vertical movement on said stud, and the upper part of said pawl or ratchet is bifurcated to receive an eccentric 72, formed on the driving shaft 24, so that each time the shaft is rotated the pawl will be reciprocated to advance the feeding-wheel one step. The parts are so timed that the feeding takes place during the upward movement of the carrier, the shoe remaining stationary during the downward movement thereof. From this description it will be seen that a shoe is placed upon the work-support while the latter is moved outwardly. Then the work-support is forced back into the position shown in Figs. 1 and 3, the machine is set in motion, and slugs or nails are driven into the heel, the heel being advanced one step for each reciprocation of the driver until a line of slugs or nails has been driven into place.

By employing the rotating head inside of the shoe and rotating the feeding-wheel which engages the top lift I am enabled to secure an accurate feeding of the work, the said head and feed-wheel being proportioned and connected by their intermediate gears so as to cause the feed wheel and the work to rotate at the same peripheral speed.

It is unnecessary to relate in detail the advantageous features of my invention, since they are apparent to those skilled in the art to which it relates. By one single mechanism I effect the feeding, driving and severing of the wire, said mechanism consisting simply of a carrier and two coacting jaws, and in this connection I may state that in some instances I may dispense with one jaw, though its equivalent in this case—to wit, a stationary abutment to resist the thrust of the cutting edge—must be employed. In any case it will be observed that my machine may be employed for driving non-headed wire. Hitherto it has been attempted to drive and sever string-nails at one operation; but machines for that purpose cannot be used for driving and severing smooth or even corrugated wire.

By employing the cutter-jaws the wire is gripped and driven into the work positively without danger of bending, and as the resistance to the penetration of the wire increases during the insertion of the latter in the work the cutting edges bite farther and farther into the wire and finally sever it, the severing being accomplished partly by the resistance to the penetration and partly by the jaws engaging the feed-wheel, in some cases. The severing action of the cutters depends largely upon the size of the wire from which the slugs are formed, for when small wire is used the severing may take place prior to the slug being fully driven into the heel. Where large wire is employed, the jaws are of course separated to a greater extent and their angle to the wire is varied, their ends being at a greater distance from the line connecting the fulcrum-rod than when the small wire is employed, and therefore the complete severing of the wire does not usually take place until the jaws engage the feed-wheel. The shape of the operative ends of the jaws is such that the head of the driven and severed ends of the wire is practically smooth, while the end of the wire itself is formed into an awl or V-shaped point. This action of the cutters is largely due to the fact that the head is moving longitudinally of the wire, whereas the resistance to the penetration of the wire is in the opposite direction, and consequently the cutting edges operate in a measure to skive the wire and completely sever the wire without breaking it, and thereby leaving a thin jagged fin. This likewise prevents the formation of a similar fin upon the head of the severed end. The latteral pressure of the cutters against the wire assists in the formation of the V-shaped clenching end. This is an important result achieved by my mechanism, and I believe that I am the first to provide a machine of the character indicated herein having a single mechanism which in one operation drives the end of a wire into the work and severs the driven end and also that I am the first to provide the said mechanism which in addition to driving and severing points the end of the wire for the next slug or nail. It is unnecessary to herein enumerate the advantages incident to such a mechanism more than to state that I am able with one single mechanism to accomplish what has been attempted by numerous parts, thus simplifying the construction of the machine, rendering it strong and durable and greatly enhancing its general efficiency.

Having thus explained the nature of the invention and described a way of constructing and using the same, although without attempting to set forth all of the forms in which it may be made or all of the modes of its use, I declare that what I claim is—

1. A machine of the character described comprising a combined driving and severing mechanism for driving the end of a wire into the work and severing the same, said mechanism consisting of jaws held together by yielding pressure and being arranged so as to bite into the wire by the resistance to the movement of the wire, and provisions whereby the work may be introduced into the path of the said wire end.

2. A machine of the character described comprising a combined wire feeding, driving and severing mechanism for feeding, driving and severing a nail from a wire, said mechanism consisting of a driver having two coacting members movable relatively to said driver, and which are adapted to engage the wire and to be so moved by reason of resistance of the wire, and which when so moved bite into the wire, and a work-support in operative relation to said mechanism.

3. A machine of the character described comprising a movable carrier and spring-pressed jaws thereon for automatically gripping, engaging and driving a smooth wire into the work, and severing the driven end, means in consequence of which said jaws are operated, and a work-support in operative relation to said jaws.

4. A machine of the character described comprising a movable carrier and a pair of coacting members thereon for driving the end of a wire into the work, one of said members being movable toward and from the other member and having a cutting edge adapted to engage the wire and press it against said other member and to sever it, and being so operated to some extent by the resistance to the penetration of the end of the wire.

5. A machine of the character described comprising a movable carrier, means for actuating said carrier, complemental wire driving and severing jaws movably mounted on said carrier and adapted to engage and drive a wire into the work and to be moved to sever the driven end without the direct actuation of said jaws by said actuating means but in consequence of the actuation of the carrier, and a work-support in operative relation to said jaws.

6. A machine of the character described comprising a movable carrier, and yielding wire driving and severing jaws thereon, adapted to drive a wire into the work and to sever the driven end, said jaws being operated to some extent by the resistance to the movement of the wire.

7. A machine of the character described comprising a movable carrier, an actuator for said carrier, complemental cutting-jaws on said carrier through which the wire may pass, said jaws being adapted to force the wire into the work, means independent of said actuator and coacting with the same for causing said jaws to sever the wire, and means for supporting the work in opposition to the forcing action of said jaws.

8. A machine of the character described comprising a movable carrier, complemental cutting-jaws supported on said carrier and movable relatively thereto and adapted to engage and drive a wire into the work, and a work-support having a stop adapted to cause said cutting-jaws to move relatively to said carrier to cause them to sever the wire.

9. A machine having a throat for the passage of a wire, a device movable relatively to the wall of said throat and adapted to cooperate therewith to hold the wire against retrograde movement, a reciprocatory carrier movable toward and from the work, means for actuating said carrier, and coacting members on said carrier having cutting edges movable toward and from each other and which during the movement of the carrier toward the work are caused to engage and drive a wire into the work and which are so moved by contact with the work to sever the driven end and to point the wire from which the end was severed.

10. A machine having a throat for the passage of a wire, a device to hold the wire against retrograde movement, grippers movable toward the work to drive the end of a wire into the work and away from the work to take a fresh grip on the wire, said grippers having cutting edges to sever the driven wire and operating by reason of resistance to the movement of said wire, and a work-support in operative relation to said grippers.

11. A machine of the character described, comprising a support for the work, a movable member movable toward and from the support, means for actuating said member, and jaws movably supported on said member and which are adapted to grip a wire so that said member causes them to drive the end of the wire into the work, and which are adapted to engage the work and be caused by engagement with the work to cease driving the wire and to move relatively to said movable member to sever the driven end.

12. A machine of the character described comprising a support for the work, a member movable toward and from the support, and means carried by said member and being movable relatively thereto, to engage and grip wire and drive it into the work, said gripping means also operating to engage said work and to be moved thereby upon the carrying member to sever the wire flush with the work.

13. A machine of the character specified comprising a support for the work, a carrier movable toward and from the work, and two jaws supported on said carrier and having cutting edges which extend toward each other, said jaws being operated to sever the wire in part by the resistance of the work to the movement of said jaws, and a stop for completing the severing operation of the jaws.

14. A machine of the character specified comprising a support for the work, a carrier movable toward and from the work, and two jaws curved in the direction of their length and having cutting edges on their ends, said carrier having curved slots to receive said jaws and in which said jaws are movable to bring their cutting edges substantially into the line of the diameters of the curves of said slots.

15. In a machine of the character described, means for driving and severing the wire, said means comprising jaws coöperating with the wire to effect a driving grip thereon and operable by contact with the work to bite through the wire, means for imparting a driving motion to the jaws, and a work-rest for holding the work in position to arrest the said jaws.

16. A machine of the character described comprising a combined driving and severing mechanism having two spring-pressed jaws adapted to drive the end of a wire into the work and sever the wire between them, and devices in consequence of which said jaws are operated.

17. A machine of the character described comprising a pair of opposed severing jaws, a support on which said jaws are mounted to move towards each other, means for presenting a strip of fastener material between said jaws in a predetermined line of drive, means for supporting the work in said line of drive in position to receive the end of the strip, and mechanism for actuating said jaws to cause them to grip, drive into stock supported by the work support and sever said strip, said mechanism including means for controlling the closing movement of said jaws to insure their meeting substantially at the center of said line of drive.

18. A machine of the character described comprising a pair of opposed severing jaws, a support on which said jaws are mounted to move towards each other, means for presenting a strip of fastener material between said jaws in a predetermined line of drive, means for actuating said jaws to cause them to grip and feed said strip, drive it into the work and completely sever said strip immediately at the end of the driving operation, said means including devices for controlling the closing movement of said jaws to insure their meeting at the center of said line of drive, and means for holding the strip against retrograde movement.

19. A machine of the character described comprising, in combination with a work support, a movable carrier and a pair of opposed severing jaws mounted thereon and adapted to move simultaneously towards a strip of fastener material located between them, means for presenting said strip in a predetermined line of drive, and means for actuating said carrier and jaws to cause the latter to grip said strip, drive it into the work and completely sever said strip immediately at the end of the driving operation to form a fastening.

20. A machine of the character described comprising, in combination with a work support, a movable carrier and a pair of opposed severing jaws mounted thereon and adapted to move simultaneously towards a strip of fastener material located between them, means for presenting said strip in a predetermined line of drive, means for actuating said carrier and jaws to cause the latter to grip, feed, drive into stock supported by the work support and sever said strip to form a fastener, and means for holding said strip against retrograde movement.

21. In a machine of the character described, in combination with a work-support, a driving and severing mechanism comprising a movable carrier and a pair of opposed jaws mounted thereon and arranged to permit a downward movement of the carrier relative to their cutting edges during the severing action of the latter.

22. In a machine of the character described, in combination with a work support, a driving and severing mechanism comprising a movable carrier and a pair of opposed jaws pivotally mounted thereon, the pivotal centers of said jaws being located in a transverse line extending closely adjacent to their cutting edges when the jaws are closed, and means for actuating said carrier and jaws.

23. A machine of the character described comprising, in combination with a work support, a movable carrier and a pair of opposed severing jaws mounted thereon and adapted to move simultaneously towards a strip of fastener material located between them, and means for actuating said carrier and jaws to cause the latter to grip, drive and sever said strip to form a fastener, said jaws being mounted to permit a downward movement of the carrier relative to their cutting edges during the severing action of the latter.

24. A machine of the character described comprising, in combination with a work support, a movable carrier and a pair of opposed severing jaws mounted thereon and adapted to move simultaneously towards a strip of fastener material located between them, means for actuating said carrier and jaws to cause the latter to grip, drive and sever said strip to form a fastener, and means for arresting the driving movement of said jaws during the severing action thereof.

25. A machine of the character described comprising, in combination with a work support, a movable carrier and a pair of opposed severing jaws pivotally mounted thereon and adapted to receive a strip of fastener material between them, the pivotal centers of said jaws being located in a transverse line extending closely adjacent to their cutting edges when the jaws are closed, and means for actuating said carrier and jaws to cause the latter to grip, drive and sever said strip to form a fastener.

26. In a machine of the character described, a carrier, a pair of opposed fastening gripping, driving and severing jaws mounted on said carrier in such manner that relative movement of said jaws and carrier effects an opening or a closing movement of the jaws in accordance with the direction of such relative movement, means for reciprocating said carrier and jaws together, and means interposed in the path of such reciprocating movement for automatically effecting a relative movement of the jaws and carrier.

27. In a machine of the character described, the combination with a carrier and opposed severing jaws mounted on said carrier to move therewith, said jaws being movable relatively to said carrier into gripping relation to a fastener strip, of means to reciprocate said carrier, means to actuate said jaws to cause them to grip and drive said strip and a stop interposed in the path of movement of said jaws to impart to them a strip severing movement.

28. A machine of the character described, comprising a pair of opposed severing jaws, a support on which said jaws are mounted to move towards each other, means for presenting a strip of fastener material between said jaws in a predetermined line of drive, means for supporting the work in said line of drive in position to receive the end of the strip, mechanism for actuating said jaws to cause them to grip and drive the end of said strip into stock supported by the work support, and a stop in the path of said jaws for imparting to them a strip severing movement.

In testimony whereof I have affixed my signature in presence of two witnesses.

ALBERT F. PRESTON.

Witnesses:
E. D. CHADWICK,
JOSEPH T. BRENNAN.